Patented Apr. 22, 1924.

1,491,265

UNITED STATES PATENT OFFICE.

ERNEST HOPKINSON, OF NEW YORK, N. Y.

PROCESS OF HALOGENATING LATEX AND COMPOSITIONS AND ARTICLES MADE THEREFROM.

No Drawing.   Application filed August 3, 1922. Serial No. 579,493.

*To all whom it may concern:*

Be it known that I, ERNEST HOPKINSON, a citizen of the United States, residing at New York city, county of New York, and State of New York, have invented certain new and useful Improvements in Processes for Halogenating Latex and Compositions and Articles Made Therefrom, of which the following is a full, clear, and exact description.

This invention relates to processes for halogenating latex and compositions and articles made therefrom. The term "latex" as herein employed relates to the juices of plants producing rubber, balata and gutta percha.

Heretofore, halogenation has been conducted upon crude rubber dissolved in an organic solvent. The choice of such solvent has been limited either to one unaffected by the halogens, or if a solvent such as benzol were used special precautions had to be taken to prevent chlorination of the solvent. Where recovery of the solvent has been attempted, expensive recovery apparatus had to be installed. Furthermore, the crude rubber employed had to be coagulated, washed and milled to break down its structure before solution in the solvent necessitating an increase in expense of labor and machine operation and providing furthermore a rubber having a somewhat depreciated physical condition.

The principal object of the present invention accordingly is to do away with the disadvantages inherent in the preparation of chlorinated rubber employing solutions of rubber in an organic solvent, and to provide compositions and articles containing halogenated rubber prepared by a process which shall yield a product having improved physical properties without the use of expensive and inflammable solvents and with a minimum of labor and machine operation. Another object of the invention is to make a series of articles containing rubber which it has been impracticable or impossible to produce heretofore.

The invention accordingly consists broadly in halogenating a substantially dry mixture containing distributed solid particles of rubber by subjecting the same to a halogen.

The term "halogen" as herein used is intended also to include halogen acids, and accordingly, halogenating latex refers to either treatment of latex with a halogen or halogen acid.

It has been found in accordance with this invention that where the chlorine or other halogen or halogen acid is introduced into latex as such, coagulation occurs and the process stops with only a portion of the rubber chlorinated. If, however, the solid particles of the latex can be kept apart with a large surface area exposed, halogenation to any desired extent may be conducted.

As a preferred procedure, the following is carried out:—100 parts by weight of kieselguhr is wet with 150 parts by weight of water to which has been added 9 parts by weight of concentrated ammonia, which latter acts as an anticoagulant of the latex subsequently added. The mixture is thoroughly agitated in a mixer and all parts of the filler—kieselguhr—are thoroughly moistened. 100 parts by weight of latex containing approximately 36% solids are then added and the mass agitated until homogeneously mixed, or until the mass is smooth or free from any granular structure. As so prepared the mass may be stored practically indefinitely without coagulation of the latex.

In case it is desired to remove the excess of water without regard to the shape of the pressed material, the compound may be placed in a suitable cloth bag and pressed in a press until the excess of water is removed or it may be run through a filter press or dried in any other way desired.

For the preparation of a material of wide application and particularly adapted for use as a floor material, the following procedure is carried out: A quantity of the latex and filler mixture prepared as above, the excess water having been removed, is screened or otherwise treated to cause it to assume a fine granular form and dried at 200° F. When dry the material is placed in a suitable container and subjected to chlorine gas until the weight has increased to 20-24% based on the original weight employed or until no more chlorine will be absorbed. The end of the reaction is indicated when greenish fumes persist about the material after standing for some time. At this time the vessel is opened and allowed to aerate thoroughly. It is then aerated thoroughly and concentrated ammonia is stirred into the powder to neutralize the last traces of acid. The material is preferably washed to remove any ammonium chloride formed. It is then dried and ready for molding or pressing. If a mottled effect is desired a dry pigment such as ultramarine blue, chrome green, iron oxide, raw sienna or any other pigment may be mixed with the powder. For ceramic-like slabs the powder is placed in a suitable mold or frame and pressed in a hydraulic press for ten minutes at 225–240° F. whereupon the material may be removed as a slab.

The chlorinated material may be formed into cups, bars, discs or any other shaped article desired. Slabs suitable for flooring may be made by running the material through a machine for rapidly stamping out small tablets. Material so formed is hard and not affected by water, oils or gasoline. It is of fine grain and the surface when rubbed with emery cloth or suitable polishing material rapidly acquires a brilliant lustre.

Other fillers or compounding ingredients than kieselguhr such as, magnesium carbonate or other material may be used in place of kieselguhr. The latex employed may be in the concentrated form of latex butter, in normal form or diluted as desired.

Instead of the above operations a porous slab may be formed as the first operation, chlorination being effected later. This is done by pressing the wet unchlorinated mixture above to a desired size and shape, and then drying it in a suitable oven at about 200° F. This method of drying provides a product of remarkable porosity and whiteness. After drying the large slabs may be cut into any desired size. The cut dried slabs are now placed in a suitable receptacle so as to allow circulation between each slab and chlorine gas is then introduced at intervals. As rapidly as the gas is absorbed more gas is introduced. The large quantities of hydrochloric acid gas that are produced may be removed from time to time by blowing out. Considerable heat is developed and care should be exercised not to chlorinate too rapidly as there is danger of burning the material. Chlorination is stopped when the slabs have increased in weight from 20–24%. The chamber is allowed to aerate thoroughly until most of the acid fumes have escaped, and if desired a vessel containing concentrated ammonia may be introduced and the slabs exposed several hours or over night to the ammonia fumes to neutralize the last traces of acid.

Porous slabs made as above will absorb water. If a waterproof non-absorbent finish is desired they may be given two coats of the following:—

| | Parts by weight. |
|---|---|
| Titanium oxide | 15 |
| Raw sienna | 0.2 |
| Chlorinated rubber $CCl_4$ sol. 20% | 100 |
| Solvent naphtha | 25 |

When thoroughly dry a coat of chlorinated rubber made as follows may be applied:—

| | Parts by vol. |
|---|---|
| Chlorinated rubber solution 20% in $CCl_4$ | 100 |
| Solvent naphtha | 50 |

This last coat gives a high gloss to the surface and is recommended as a varnish to be applied at intervals after the tiling is in use. These coats make the material more easily cleaned than ordinary rubber flooring.

If desired the chlorinated slab formed as above described may be ground and the ground material used for the preparation of non-porous articles as described.

A product similar in appearance to hard rubber having many of the properties thereof may be prepared as follows:—

| | Parts by weight. |
|---|---|
| Dry powdered completely chlorinated latex-filler mixture (containing the ingredients described in the first procedure above, for example) | 90 |
| Carbon black | 15 |
| Solvent (benzol, solvent naphtha, etc.) | 36 |
| Ground scrap or uncured rubber (e. g. pale crêpe) | 10 |

The latex-filler mixture, carbon black and solvent are mixed in a suitable mill until a uniform mixture is obtained at which time the ground scrap or other rubber is added. This has the effect of causing the mixture to crumble to a powder and when a homogeneous mixture is obtained the material is ready for molding. This latter operation may be carried out to advantage at a temperature of 200–240° F. The material is characterized by the rapidity with which it can be molded, a few minutes being ordinarily sufficient. This material closely resembles hard rubber, taking a high polish and being adapted for use where molded articles of vulcanized hard rubber are commonly used such as in electrical apparatus, etc.

If it is desired to make a product which can be milled and calendered the chlorination of the powdered materials should be stopped when 8–10% chlorine has been absorbed. The product chlorinated to this extent can be milled and calendered in much the same way as ordinary rubber. After the calendering the product is again subjected to chlorine fumes to remove all tackiness from the surface. Slabs of any desired thickness may be formed by molding the milled product in a suitable mold. Flooring may also be made by cutting into desired shapes and cementing to a backing.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process of halogenating a substantially dry mixture containing distributed solid particles of rubber by subjecting the same to a halogen.

2. A process of the kind described which comprises drying latex, maintaining the solid particles thereof in a form having a large surface area exposed and halogenating the latex.

3. A process of the kind described which comprises subjecting a mixture of latex and a filler to the action of a halogen.

4. A process of the kind described which comprises subjecting a mixture of latex and kieselguhr to the action of chlorine gas.

5. A process of the kind described which comprises mixing latex with a filler, drying and chlorinating the mixture.

6. A process of the kind described which comprises halogenating a finely divided comparatively dry homogeneous mixture of latex and a filler.

7. A process of the kind described which comprises chlorinating a finely divided mixture of latex and a filler and molding said mixture under heat and pressure.

8. A process of the kind described which comprises forming a homogeneous mixture of approximately equal parts of latex and a filler, drying the mixture and chlorinating the mixture until approximately a 20–24% increase in weight is obtained.

9. A process of the kind described which comprises adding an anticoagulant to latex, grinding, mixing a filler therewith, drying and chlorinating the mixture.

10. A process of the kind described which comprises chlorinating a finely divided homogeneous mixture of latex and a filler, interrupting the chlorination when 8–10% of chlorine has been absorbed, calendering the product formed, and subjecting the surfaces of the calendered material to the action of chlorine to remove tackiness therefrom.

11. A composition of matter comprising chlorinated latex.

12. A composition of matter comprising a filler combined and dried with latex and chlorinated.

13. A composition of matter comprising latex admixed with a filler and chlorinated, ground rubber and a pigment, adapted to be molded under heat and pressure to a desired form.

14. A composition of matter comprising chlorinated latex and kieselguhr.

15. A composition of matter comprising dry ground chlorinated latex admixed with kieselguhr 90 parts, a pigment 15 parts, ground rubber material 10 parts, and adapted to be molded under heat and pressure.

16. A tile or similar article comprising chlorinated latex with a filler dried and pressed into the desired form.

17. A tile or similar article comprising latex chlorinated in the presence of kieselguhr and dried, molded and coated with a water-proofing composition.

18. An article comprising chlorinated latex, ground rubber, and a pigment molded under heat and pressure.

Signed at New York, N. Y., this 1st day of August, 1922.

ERNEST HOPKINSON.